United States Patent [19]
Osajda et al.

[11] Patent Number: 5,773,820
[45] Date of Patent: Jun. 30, 1998

[54] ROTARY POSITION SENSOR WITH REFERENCE AND GREY SCALES

[75] Inventors: Marc Osajda; Arnaud Delpoux, both of Toulouse, France

[73] Assignee: Motorola, Inc., Schaumburg, Ill.

[21] Appl. No.: 656,997

[22] Filed: May 29, 1996

[30] Foreign Application Priority Data

Jun. 12, 1995 [FR] France .................................. 95 06902

[51] Int. Cl.$^6$ ....................................................... G01D 5/34
[52] U.S. Cl. ................................ 250/231.14; 250/231.13; 250/231.18; 250/214 C
[58] Field of Search ......................... 250/231.18, 231.13, 250/231.17, 231.14, 214 B, 214 C

[56] References Cited

U.S. PATENT DOCUMENTS

| | | |
|---|---|---|
| 4,109,389 | 8/1978 | Balcom et al. ........................ 33/363 K |
| 4,604,521 | 8/1986 | Takekoshi et al. ................. 250/231 SE |
| 5,376,783 | 12/1994 | Vecht et al. .......................... 250/214 B |

FOREIGN PATENT DOCUMENTS

| | | |
|---|---|---|
| 0218308 | 4/1987 | European Pat. Off. . |
| 60-008714 | 1/1985 | Japan . |
| 8600697 | 1/1986 | WIPO . |

*Primary Examiner*—Edward P. Westin
*Assistant Examiner*—Kevin Pyo
*Attorney, Agent, or Firm*—Harry A. Wolin; Rennie William Dover

[57] ABSTRACT

A steering wheel shaft (103) position sensor includes a light emitter (110) fixed with respect to the shaft (103) and a pair of light detectors (111, 112) fixed with respect to the emitter (110). A disc (113) is mounted for rotation on the shaft (103) between the emitter (110) and the detectors (111, 112) and has a grey scale track extending circumferentially on the disc (113) between the emitter and one of the detectors (111), the grey scale varying from opaque to transparent to the light emitted by the emitter (110). A second, transparent track extends circumferentially on the disc (113) between the emitter and the other detector (112). The outputs of the two detectors (111, 112) are compared to provide an indication of the movement of the shaft (103).

8 Claims, 3 Drawing Sheets

ROTARY POSITION SENSOR WITH REFERENCE AND GREY SCALES

FIELD OF THE INVENTION

This invention relates to optoelectronic sensors, and more particularly, though not exclusively, to optoelectronic sensors for sensing position, such as angular position, and to compensation systems for such sensors.

BACKGROUND OF THE INVENTION

In automotive technology, it is becoming more and more desirable to sense an ever growing number of parameters so that the functioning of an automobile can be accurately controlled. There is therefore a requirement for sensors that can measure position, particularly angular position of a rotating shaft, for example, for automobile height, throttle position or accelerator pedal position. A large number of different types of such sensors are known, for example, capacitive, inductive or magnetic using the Hall effect. However these sensors do not produce an accurate linear output and are sensitive to electromagnetic interference (EMI), which can be high in an automotive environment. Optoelectronic sensors for steering wheel position sensing are also known, but they measure movement of the shaft and do not give a direct measurement of the stationary position of the shaft.

BRIEF SUMMARY OF THE INVENTION

The present invention therefore seeks to provide an optoelectronic position sensor which overcomes, or at least reduces the above-mentioned problems of the prior art.

Accordingly, in a first aspect, the invention provides an optoelectronic position sensor comprising an optical emitter, an optical detector and a substrate movable with respect to the emitter and the detector and having thereon a grey scale extending in the direction of movement, the grey scale varying in opacity from a first end which is substantially opaque to light emitted by the emitter to a second end which is substantially transparent to the light, the optical detector detecting the amount of light transmitted from the emitter and passed through the grey scale on the substrate to provide an indication of the position of the substrate relative to the emitter and detector.

Preferably, the grey scale is provided on a first track on the substrate and a second parallel track is provided which has the same transparency as the transparent end of the grey scale, the sensor further including a second detector for detecting the amount of light transmitted from the emitter and passed through the second track on the substrate, the outputs of the two detectors being compared to provide an indication of the position of the substrate. Preferably, the substrate is of plastic material and the grey scale is provided by photographic techniques. In a preferred embodiment, the substrate is a disc for positioning on a shaft whose angular position is to be sensed and the grey scale extends in a circumferential direction for sensing the angular position of the shaft.

Although the terms "optical" and "light" have been used herein, it should be understood that these terms include all wavelengths between and including infrared and ultraviolet.

When optoelectronic sensors are in use, particularly, though not exclusively in an automotive environment, a number of factors, such as temperature, dust and aging can degrade the amount of light transmitted to the detector(s).

Therefore, in a second aspect, the invention provides an optoelectronic sensor compensation system for an optoelectronic sensor having an optical emitter and first and second optical detectors, a first of which detects the amount of light transmitted through a modulating path and the second of which detects the amount of light transmitted through a reference path, the compensating system comprising a reference channel including an input for receiving the output signal of the second detector, a controllable chopping switch for chopping the signal at the input according to an adjustable duty cycle, and a filter for averaging the chopped signal to provide an output of the reference channel, a modulation channel including an input for receiving the output signal of the first detector to provide an output of the modulation channel, a comparator for comparing the outputs of the modulation and reference channels and providing an output indicating whether the outputs of the modulation and reference channels are the same or not, the output of the comparator being used to control the chopping switch so as to try to equalize the outputs of the modulation and reference channels, and a filter for averaging the output of the comparator thereby providing an indication of the ratio between the output signals of the two detectors.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
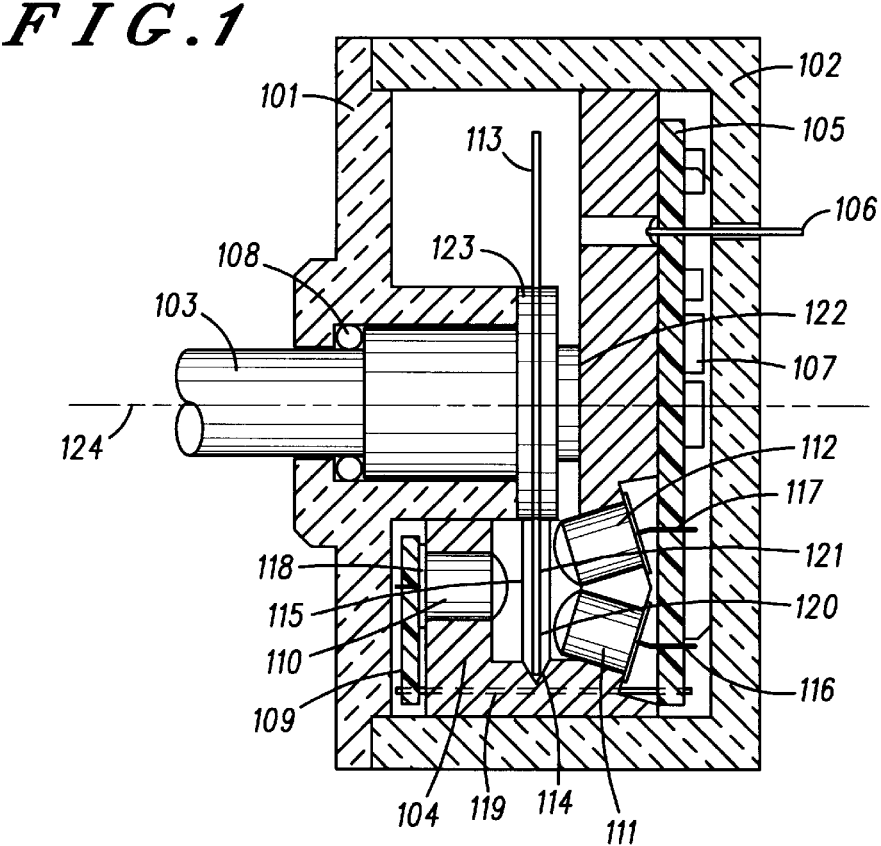
FIG. 1 shows a cross-sectional view of an optoelectronic angular position sensor according to the invention.

FIG. 1 shows a cross sectional view of an optoelectronic angular position sensor according to the invention. A circular thick film plastic disc 113 is mounted on a shaft 103, whose angular position is to be sensed, and which passes through a housing 101. The shaft 103 and disc 113 rotate on an axis 124. An O-ring 108 is mounted between the shaft 103 and the housing 101 to provide a seal against particles and fluids.

A light emitter 110 is mounted in a saddle 104. A light beam 115 emitted from the emitter 110 reaches two photodetectors 111 and 112 which are also mounted in the saddle 104 in front of the emitter 110. A particular angular positioning of the detectors 112 and 111 is used so that the emitter 110 correctly radiates approximately the same amount of light into both the two detectors 112 and 111. The first detector 111 is the measurement channel and the second detector 112 is the reference channel. The second detector 112 is connected to a printed circuit board 105 via a connector 117. The first detector 111 is connected to the printed circuit board 105 via a connector 116. The emitter 110 is connected to a second printed circuit board 109 via a connector 118. A link 119 is provided between the boards 109 and 105.

Various components 107, which are needed for signal conditioning are mounted on the printed circuit board 105 and are described in more detail hereinafter. Three wires or an integrated connector 106 are also connected to the printed circuit board 105 for connection to an electronic control unit (not shown).

Lateral movement of the disc 113 and the shaft 103 is limited by abutments 123 and 122 on the housing 101 and on the saddle 104, respectively. A "V" aperture 114 is provided on the saddle 104 to further limit lateral movement of the disc 113 at its periphery. For assembly, the saddle 104, together with the emitter 110, the two detectors 111 and 112, the printed circuit boards 109 and 105 and the connector 106, is fixed in the housing 101 with the disc 113, the shaft 103 and the O-ring 108 in position. A cover 102 is used to close over the housing 101 and protect the sensor arrangement.

With this arrangement the disc 113 rotates on axis 124 between the emitter 110 and the two detectors 112 and 111. As more clearly shown in FIG. 2, a grey pattern is printed on a first circumferential track 120 of the disc 113 so that rotation of the disc 113 modulates the amount of light incident on the measurement detector 111. A second circumferential track 121 is provided without the grey pattern so that rotation of the disc 113 does not modulate the amount of light which is incident on reference detector 112. A hole 201 in the disc is used to center the disc on the shaft 103.

Figure 2:
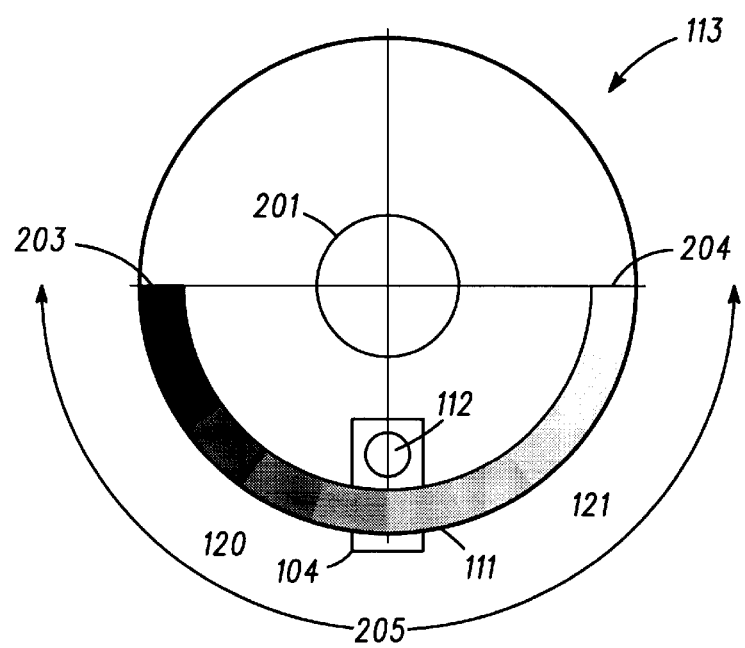
FIG. 2 shows a modulation disc used in the sensor of FIG. 1.

In the particular arrangement shown in FIG. 2, the circumferential grey scale track 120 starts from 100% opaque at one end 203, such that no light emitted by the emitter 110 reaches the measurement photodetector 111 in saddle 104, and decreases to 0% opaque at the other end 204 where it is transparent such that none of the light emitted by the emitter 110 is attenuated before it reaches the measurement photodetector 111.

The grey scale track 120 has a transfer function given by:

$$P_{out}/P_{LED} = H(\theta)$$

where $P_{LED}$ represents the amount of light emitted by emitter 110; $P_{out}$ represents the amount of light passing through the grey scale 120; and $H(\theta)$ is a transfer function, which in this particular arrangement is a linear function, although other mathematical functions could alternatively be used, given by:

$$H(\theta) = k*\theta$$

where $k = 1/\theta_{max}$ is a constant; $\theta$ is the angle of rotation between 0 degrees at the first end 203 of the track 120 and $\theta_{max}$ degrees at the other end 204 of the track 120.

Typically $\theta_{max}$ is between 90° and 360°. The particular embodiment shown in FIG. 2 has $\theta_{max} = 180°$ (as shown by reference numeral 205).

In order to improve the performance of the sensor arrangement, the reference detector 112 is placed in front of track 121 and is used to monitor the light transmitted through the disc 113. The same emitter 110 is used to provide light for both detectors 112 and 111. Since track 121 is transparent, rotation of the disc 113 does not attenuate the light received by the reference detector 112. The reference detector 112 thus monitors emitter degradation, environment degradation, disc aging, etc., which affect the light received by both detectors. The signals output by the two detectors 111 and 112 are used in the sensor compensation system described below.

The disc 113 is made of a photosensitive polyester thick film, about 200 μm thick, on which the grey scale 120 is printed by a photographic process. This type of material is fairly cheap and is capable of operating over a large temperature range (−40° C. to +125° C.). In order to maximize the level of performance, 3,330 levels of grey have been used in this embodiment to provide the grey scale variation. Each dot making up the grey scale has a diameter of approximately 7 μm.

Figure 3:
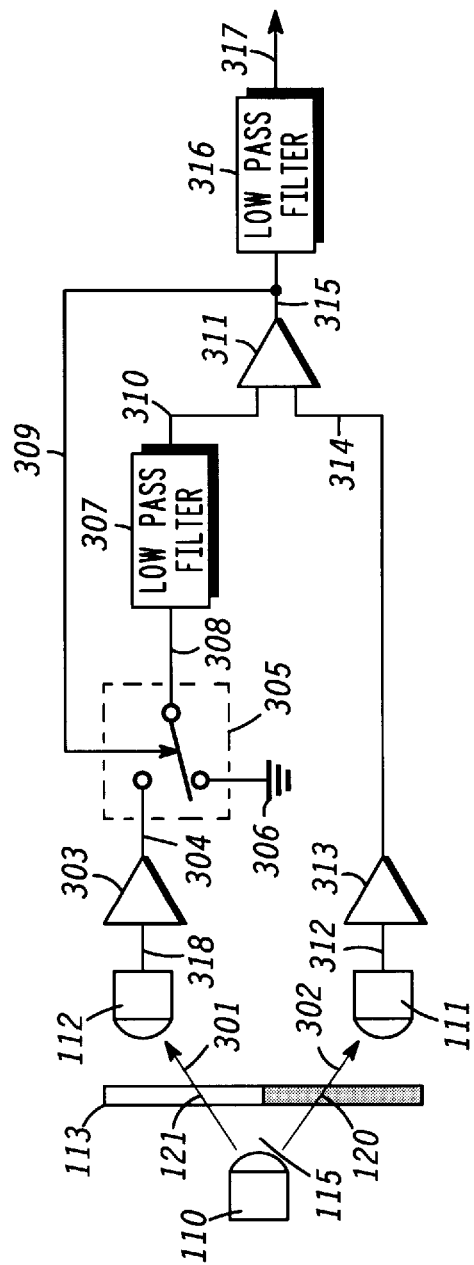
FIG. 3 shows a schematic diagram of a compensation system for use with the sensor of FIG. 1.

FIG. 3 shows a block diagram of the sensor compensation system. In this configuration light emitted by the emitter 110 passes through the disc 113 with part of the light passing through the grey scale track 120 printed on the circumference of the disc 113 and being directed at the measurement photodetector 111 and the other part of the light passes through the transparent track 121 and is incident on the reference photodetector 112.

Thus, the amount of light 302 reaching the measurement photodetector 111 is:

$$\alpha * P_{LED} * H(\theta)$$

and the amount of light 301 reaching the reference photodetector 112 is:

$$\alpha * P_{LED}$$

where $\alpha$ represents the environment attenuation between the emitter and the detectors. This attenuation is generally the same for the two detectors 111 and 112 because they are placed at the same distance from the emitter 110. This parameter can change with the environmental conditions, such as temperature, dust, humidity, disc aging, etc., but the two detectors are always affected by the same amount of degradation.

The photodetectors 111 and 112 each produce an electrical signal representing the amount of light incident on the detectors. A signal 318 from the reference detector 112 is equal to:

$$\eta_1 * \alpha * P_{LED}$$

and a signal 312 from the measurement photodetector 111 is equal to:

$$\eta_2 * \alpha * P_{LED} * H(\theta)$$

where $\eta_2$ and $\eta_2$ represent the photon to electron conversion efficiency of the detectors. $\eta_1$ and $\eta_2$ can be different for each detector, but each one varies in the same proportion with the temperature, so the effect of this variation on the output signal is relatively small. Amplification is then needed to provide a usable electrical signal. The signal 318 from the output of the reference detector 112 is amplified by amplifier 303 which has a gain $A_1$ so that the signal 304 at the output of the amplifier 303 is:

$$A_1 * \eta_1 * \alpha * P_{LED} \qquad (1)$$

The signal 312 from the output of the measurement detector 111 is amplified by amplifier 313, which has a gain $A_2$ so that the signal 314 at the output of the amplifier 313 is:

$$A_2 * \eta_2 * \alpha * P_{LED} * H(\theta). \qquad (2)$$

It can thus be seen that the factor $H(\theta)$ induces electrical signal variations with the angle of rotation which is what is required, but the factor $A_2 * \eta_2 * \alpha * P_{LED}$ can also vary, especially with temperature, disc aging and dust variations. Such variations can induce large variations in $V_{sig}$ even while the disc is not moving. This phenomenon is not desirable.

The principle of the signal degradation compensation is to produce a ratio between equation (2) and equation (1) so that this ratio can be simplified by $\alpha * P_{LED}$, which represents the most important source of signal degradation, since the optical power output of a gallium arsenide infrared light emitting diode is highly temperature dependent.

A comparator 311 is used to compare $V_{sig}$ with a signal 310 called $V_{cor}$. The comparator 311 is an operational amplifier used as a comparator, so one of its properties is that the difference between the inverting input and the non-inverting input is equal to zero (ideal operational amplifier). $V_{cor}$ represents a fraction of $V_{ref}$ given by:

$$V_{cor}=x*V_{ref} \text{ where } 0<x<1.$$

A chopper 305 is coupled with its output switching periodically between the output of the amplifier 303 and ground 306 so that the mean value after chopping is lower or equal to $V_{ref}$. To obtain a continuous voltage after chopping, a low pass filter 307 is used, which averages the chopper output signal 308. The output 310 from the low pass filter 307 thus represents $V_{cor}=x*V_{ref}$ with $0<x<1$, where x represents the duty cycle of the chopper:

$$x=t_h/T$$

where $t_h$ is the time during which the chopper output is connected to the amplifier output during a complete cycle T.

To control the chopper automatically, a feedback loop 309 is used to drive the chopper. Thus, if $V_{cor}>V_{sig}$, the comparator 311 output signal 315 will go low and, via the feedback loop 309, will switch the chopper 305 to ground 306 so that the chopper output signal 308 falls to zero. Under these conditions, after averaging through filter 307, the filter output signal 310 will decrease until $V_{cor}<V_{sig}$.

When $V_{cor}<V_{sig}$, the comparator 315 output signal goes high and, via the feedback loop 309, the chopper 305 is switched to $V_{ref}$ so that chopper output signal 308 will be equal to $V_{ref}$ and, after filtering, filter output signal 310 will increase until $V_{cor}>V_{sig}$. Thus, the loop is closed and the same phenomenon occurs always to balance $V_{cor}$ and $V_{sig}$. The frequency of the chopper switch is fixed by the comparator 311 response time. An implementation of this principle will be described below with reference to FIG. 4.

Under these conditions, if, $V_{cor}$ and $V_{sig}$ are balanced, then:

$$V_{cor}=V_{sig}$$

or $$x*A_1*\eta_1*\alpha*P_{LED}=A_2*\eta_2*\alpha*P_{LED}*H(\theta).$$

This equation can be simplified by $\alpha*P_{LED}$ so that:

$$x*(A_1*\eta_1)/(A_2*\eta_2)=H(\theta)=k*\theta$$

with $(A_1*\eta_1)/(A_2*\eta_2)$ and k constant over the time.

This relation demonstrates that x is proportional to $\theta$, and that x is not sensitive to the environment parameters like dust, aging, temperature. As mentioned earlier, x represents the duty cycle of the signal used to drive the chopper 305. In the arrangement shown in FIG. 3, the signal used to drive the chopper 305 is the output signal 315 coming from the comparator 311. The average value of the signal 315 is:

$$V_{avg}=(t_h/T)*V_{oh},$$

where $V_{oh}$ is the maximum output voltage of the comparator. To average the comparator output signal 315, a second low pass filter 316 is used so that the output signal 317 $V_{out}$ is a continuous voltage proportional to $\theta$, so that:

$$V_{out}=(t_h/T)*V_{oh}$$

or:

$$V_{out}=\theta*(1/\theta_{max})*(A_2*\eta_2)/(A_1*\eta_1)*V_{oh}$$

To obtain the maximum output span, where $V_{out}=V_{oh}$ for $\theta=\theta_{max}$, it is necessary to choose $A_1$ and $A_2$ so that $G=(A_1*\eta_1)/(A_2*\eta_2)=1$. This can be done by adjusting the gains $A_1$ and $A_2$ to obtain the same level of signal at the outputs 304 and 314 of amplifiers 303 and 313, respectively, when the two detectors 111 and 112 are illuminated under the same conditions (position $\theta=\theta_{max}$). Having $G<1$ will reduce the output span $V_{out}<V_{oh}$ for $\theta=\theta_{max}$, and having $G>1$ will not allow the full angular span $V_{out}=V_{oh}$ for $\theta<\theta_{max}$ to be read.

Figure 4:
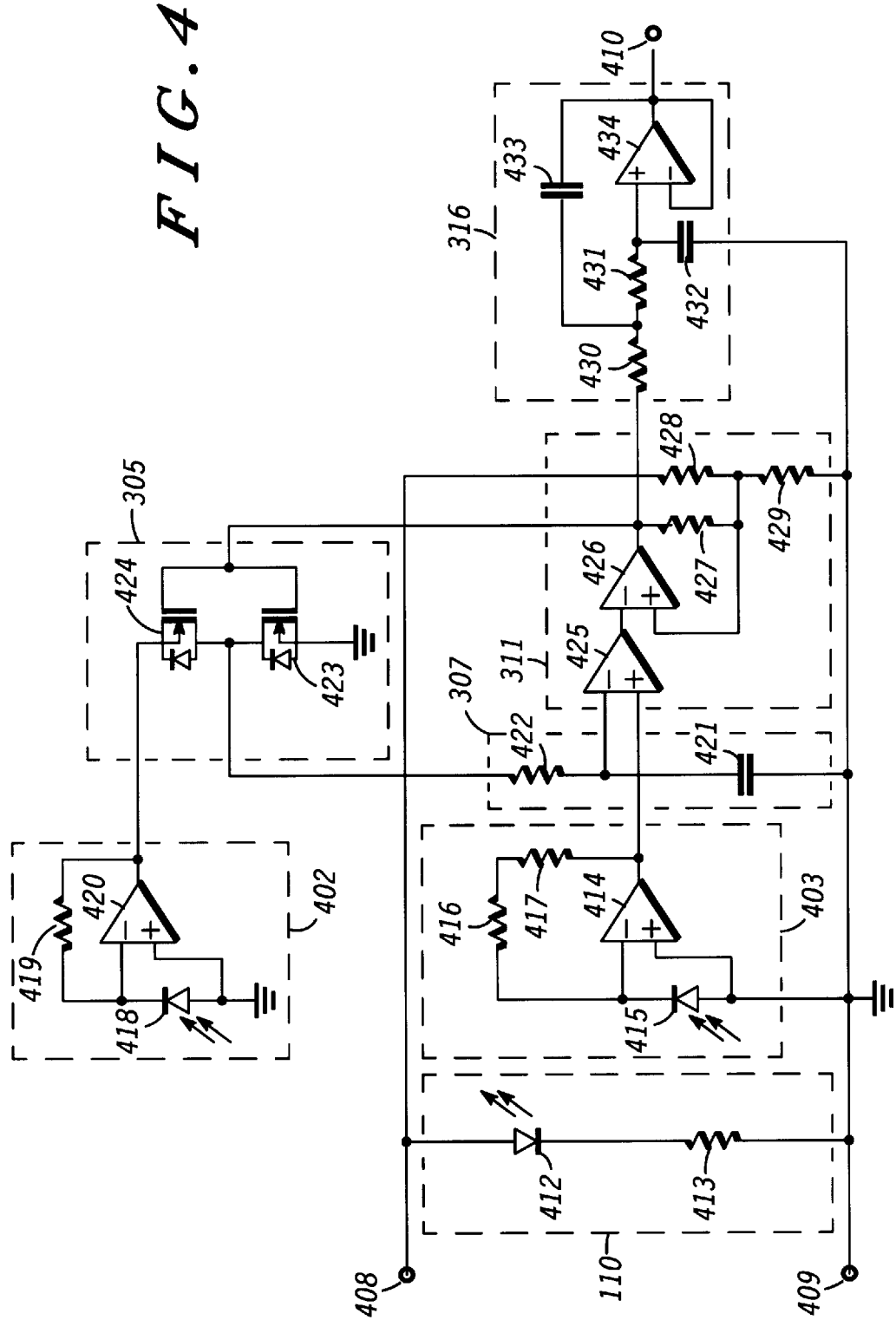
FIG. 4 shows an implementation of the compensation system of FIG. 3.

FIG. 4 shows a particular arrangement of the circuit elements described with reference to FIG. 3. Three terminals 408, 409, and 410 are connected to the integrated connector 106, and provide the power supply, the ground, and the output signal, respectively.

Emitter 110, connected between the power supply and the ground, is composed of an infrared Light Emitting Diode (LED) 412, such as a MLED930 in a metal can TO18 OPTO housing and a current limitation surface mount resistor 413. The LED 412 illuminates the two detectors 112 and 111 as described above.

The reference detector 402 is composed of a PIN photodiode 418, such as a MRD500 in a metal can TO18 OPTO housing, and an operational amplifier 420, such as the MC33202D in an SO8 surface mount package, used as a current to voltage converter. A feedback surface mount resistor 419 provides the current to voltage conversion ratio.

The measurement detector 403 is composed of a PIN photodiode 415, such as a MRD500 in a metal can TO18 OPTO housing, and an operational amplifier 414, such as the MC33202D in an SO8 surface mount package, used as a current to voltage converter. Two feedback surface mount resistors 416 and 417 provide the current to voltage conversion ratio. Resistor 416 is a fixed value resistor and resistor 417 is a calibration resistor which must be adjusted to obtain the same level of signal at the output of amplifier 414 as at the output of amplifier 420, as described above, when the two detectors are illuminated under the same conditions. This calibration is necessary to adjust the output signal full span to its maximum value. For the detectors, PIN diodes are preferable as they have good linearity and efficient photon to electron conversion.

The chopper 305 is composed of a pair of complementary surface mount MOSFET transistors 424 and 423. Transistor 424 is a P-channel enhancement mode TMOS MOSFET, such as the MMBF0202P in a SOT23 package, and transistor 423 is an N-channel enhancement mode TMOS MOSFET, such as the MMBF0201N in a SOT23 package. These devices have a low drain—source on resistance ($R_{DS(on)}$) which provides minimal power loss and higher efficiency.

The first low pass filter 307 used to average the signal coming from the chopper 305 is a first order filter composed of a surface mount resistor 422 and a surface mount capacitor 421.

The comparator 311 is composed of two operational amplifier 425 and 426, such as the MC33202D in a SO8 surface mount package, used in a comparator configuration. The first operational amplifier 425 compares the measurement signal coming from the measurement detector 403 with the corrected voltage coming from the low pass filter 307. The second operational amplifier 426 is used to slow down the state changes from the operational amplifier 425 to an acceptable value compared to the operational amplifier slew rate. The operational amplifier 426 used as a comparator with hysteresis is dedicated to this function. Good switching characteristics are obtained with the switching limits set at 0.25*Vcc and 0.75*Vcc. Surface mount resistors 427, 428 and 429 are used to set these switching points. The output of the comparator 311 drives the chopper 305 and the output filter 316.

The output filter 316 is a second order Sallen-Key low pass filter used to average the digital signal from the comparator 311. The second order active filter provide stronger filtering and also a low output impedance compared to a typical R-C filter. The mean value of the signal output from the comparator 311 is proportional to the input angle of rotation as described hereinabove.

The output filter 316 is composed of a "rail to rail" operational amplifier 434, such as MC33202D in a SO8 surface mount package. For maximum amplitude, two resistors 430 and 431, and two capacitors 432 and 433, are selected. For maximum efficiency it is preferable to set the same cut off frequency for both the low pass filter 307 and the output filter 316. With a cut-off frequency of between 650 and 1000 Hz, the averaging of the digital signal output from the comparator 311 with a frequency in the range of 15 Khz is efficient and maintains a fast response time of the system (<10 ms).

The output signal from terminal 410 can thus be used directly by an electronic control unit (not shown).

It will be appreciated that although only one particular embodiment of the invention has been described in detail, various modifications and improvements can be made by a person skilled in the art without departing from the scope of the present invention.

We claim:

1. An optoelectronic sensor compensation system for an optoelectronic sensor having an optical emitter and first and second optical detectors, a first of which detects the amount of light transmitted through a modulating path and the second of which detects the amount of light transmitted through a reference path, the compensation system comprising a reference channel including an input for receiving the output signal of the second detector, a controllable chopping switch for chopping the signal at the input according to an adjustable duty cycle, and a filter for averaging the chopped signal to provide an output of the reference channel, a modulation channel including an input for receiving the output signal of the first detector to provide an output of the modulation channel, a comparator for comparing the outputs of the modulation and reference channels and providing an output indicating whether the outputs of the modulation and reference channels are the same or not, the output of the comparator being used to control the chopping switch so as to try to equalise the outputs of the modulation and reference channels, and a filter for averaging the output of the comparator thereby providing an indication of the ratio between the output signals of the two detectors.

2. An optoelectronic position sensing system comprising an optical emitter, a first optical detector and a substrate movable with respect to the emitter and the first optical detector and having thereon a grey scale extending on a first track in the direction of movement, the grey scale varying in opacity from a first end which is substantially opaque to light emitted by the emitter to a second end which is substantially transparent to the light, the first optical detector detecting the amount of light transmitted from the emitter and passed through the grey scale on the substrate, the substrate having thereon a second track, parallel with the first track and having the same transparency as the second end of the grey scale, the system further comprising a second optical detector for detecting the amount of light transmitted from the emitter and passed through the second track on the substrate, and a compensating system comprising a reference channel including an input for receiving the output signal of the second detector, a controllable chopping switch for chopping the signal at the input according to an adjustable duty cycle, and a filter for averaging the chopped signal to provide an output of the reference channel, a modulation channel including an input for receiving the output signal of the first detector to provide an output of the modulation channel, a comparator for comparing the outputs of the modulation and reference channels and providing an output indicating whether the outputs of the modulation and reference channels are the same or not, the output of the comparator being used to control the chopping switch so as to try to equalise the outputs of the modulation and reference channels, and a filter for averaging the output of the comparator thereby providing an indication of the ratio between the output signals of the two detectors, thereby providing an indication of the position of the substrate relative to the emitter and detectors.

3. An optoelectronic position sensing system according to claim 2, wherein the substrate is of plastic material and the grey scale is formed thereon by photographic techniques.

4. An optoelectronic position sensing system according to claim 2, wherein the substrate is a disc for positioning on a shaft whose angular position is to be sensed and the grey scale extends in a circumferential direction for sensing the angular position of the shaft.

5. An optoelectronic position sensing system according to claim 4, wherein the shaft is a steering wheel shaft.

6. An optoelectronic position sensing system for sensing the angular position of a shaft, the system comprising an optical emitter, a first optical detector and a disc mounted on the shaft and movable with respect to the emitter and the first optical detector and having thereon a grey scale extending on a first track in a circumferential direction for sensing the angular position of the shaft, the grey scale varying in opacity from a first end which is substantially opaque to light emitted by the emitter to a second end which is substantially transparent to the light, the first optical detector detecting the amount of light transmitted from the emitter and passed through the grey scale on the disc, the disc having thereon a second track, parallel with the first track and having the same transparency as the second end of the grey scale, the system further comprising a second optical detector for detecting the amount of light transmitted from the emitter and passed through the second track on the disc, and a compensating system comprising a reference channel including an input for receiving the output signal of the second detector, a controllable chopping switch for chopping the signal at the input according to an adjustable duty cycle, and a filter for averaging the chopped signal to provide an output of the reference channel, a modulation channel including an input for receiving the output signal of the first detector to provide an output of the modulation channel, a comparator for comparing the outputs of the modulation and reference channels and providing an output indicating whether the outputs of the modulation and reference channels are the same or not, the output of the comparator being used to control the chopping switch so as to try to equalise the outputs of the modulation and reference channels, and a filter for averaging the output of the comparator thereby providing an indication of the ratio between the output signals of the two detectors, thereby providing an indication of the position of the disc relative to the emitter and detectors.

7. An optoelectronic position sensing system according to claim 6, wherein the disc is of plastic material and the grey scale is formed thereon by photographic techniques.

8. An optoelectronic position sensing system according to claim 6, wherein the shaft is a steering wheel shaft.

* * * * *